United States Patent [19]
Shih

[11] Patent Number: 5,823,096
[45] Date of Patent: Oct. 20, 1998

[54] AUTOMATIC INFUSING APPARATUS

[76] Inventor: Chun-Hong Shih, No. 8, Lane 76, Jui-Jen Rd., Nan-Tzu Dist., Kaohsiung City, Taiwan

[21] Appl. No.: 943,294

[22] Filed: Oct. 14, 1997

[51] Int. Cl.$^6$ ..................................................... A47J 31/34
[52] U.S. Cl. ......................... 99/302 P; 99/289 R; 99/280
[58] Field of Search ................................. 99/289 R, 280, 99/286, 297, 300, 302 R, 302 P

[56] References Cited

U.S. PATENT DOCUMENTS

| | | | |
|---|---|---|---|
| 4,852,472 | 8/1989 | In-Albon et al. .................. | 99/302 P X |
| 4,885,986 | 12/1989 | Grossi ............................... | 99/302 P X |
| 5,255,594 | 10/1993 | Grossi ............................... | 99/302 P X |

*Primary Examiner*—Reginald L. Alexander
*Attorney, Agent, or Firm*—Ladas & Parry

[57] ABSTRACT

An automatic infusing apparatus includes an infusing container, lifting and lowering device for the container to higher and lower positions, device for feeding ground beans to the container when the latter is at the higher position, and a scraping device for removal of the infused ground beans. A plunger includes a sifter member which is disposed within the container and which has a peripheral portion slidable relative the container, and a stem member. The stem member has an upper section connected to the sifter member and a lower section to extend outwardly and sealingly from the lower end wall of the infusing container. The lower section of the stem member is movable relative the lower end wall of the container to lift the sift member upwardly to a scraped position downwardly to an infused position. A biasing member biases the sifter member to move from the scraped position to the infused position. When the container descends from the higher position to the lower position, the sifter member is lifted upward from the scraped position against the biasing action. A retractable moves transversely relative the stem member once the sifter member is moved upward to the scraped position so as to clear the infused ground beans away from the sifter member.

14 Claims, 9 Drawing Sheets

AUTOMATIC INFUSING APPARATUS

BACKGROUND OF THE INVENTION

1. Field of the Invention

The invention relates an infusing apparatus, more particularly to an automatic infusing apparatus.

2. Description of the Related Art

A conventional infusing apparatus includes an infusing container for receipt of ground coffee beans or grains. Boiling water is poured into the infusing container so as to infuse the ground beans. The infused liquid is poured into a cup via a sifter sheet such that the infused ground beans remained on the sifter sheet. It is inconvenient to perform several functions in order to drink a nice cup of coffee especially when one is in a rush.

In addition, it is known that the ground beans may lose flavor and tastiness when left for a period of time. For those coffee addicts, no thing can substitute the instantly-ground coffee beans.

SUMMARY OF THE INVENTION

The object of this invention is to provide an automatic infusing apparatus which can provide a cup of coffee when one is in a rush.

Another object of this invention is to provide an automatic infusing apparatus which can obviate the trouble of manually removal of the infused ground beans.

Accordingly, the automatic infusing apparatus of this invention includes an infusing container for receipt of infused beverage, means for lifting and lowering the infusing container to a higher position and a lower position, a plunger, a first biasing means, means for feeding ground beans or grain to the infusing container when the infusing container is lifted to the higher position, and a scraping device for removal of the infused ground beans. The infusing container has a lower end wall, a peripheral lateral wall which extends uprightly from the lower end wall to define an opened upper end, and an outlet valve disposed near the lower end wall for dispense of the infused beverage. The plunger includes a sifter member which is disposed within the infusing container and which has a peripheral portion slidable relative to an inner surface of the peripheral lateral wall, and a stem member. The stem member has an upper section connected to the sifter member and a lower section to extend outwardly and sealingly from the lower end wall of the infusing container. The lower section of the stem member is movable relative the lower end wall of the infusing container to lift the sifter member upwardly to a scraped position which is above the brim of the infusing container and downwardly to an infused position, wherein the ground beans are supported on the sifter member for infusion. The first biasing means biases the sifter member to move from the scraped position to the infused position. When the infusing container descends from the higher position to the lower position, the sifter member is lifted upward from the infused position to the scraped position against the biasing action of the first biasing means. The scraping device includes a retractable scraping rod which moves transversely relative to an axial direction of the stem member once the sifter member is moved upward to the scraped position so as to clear the infused ground beans away from the sifter member.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
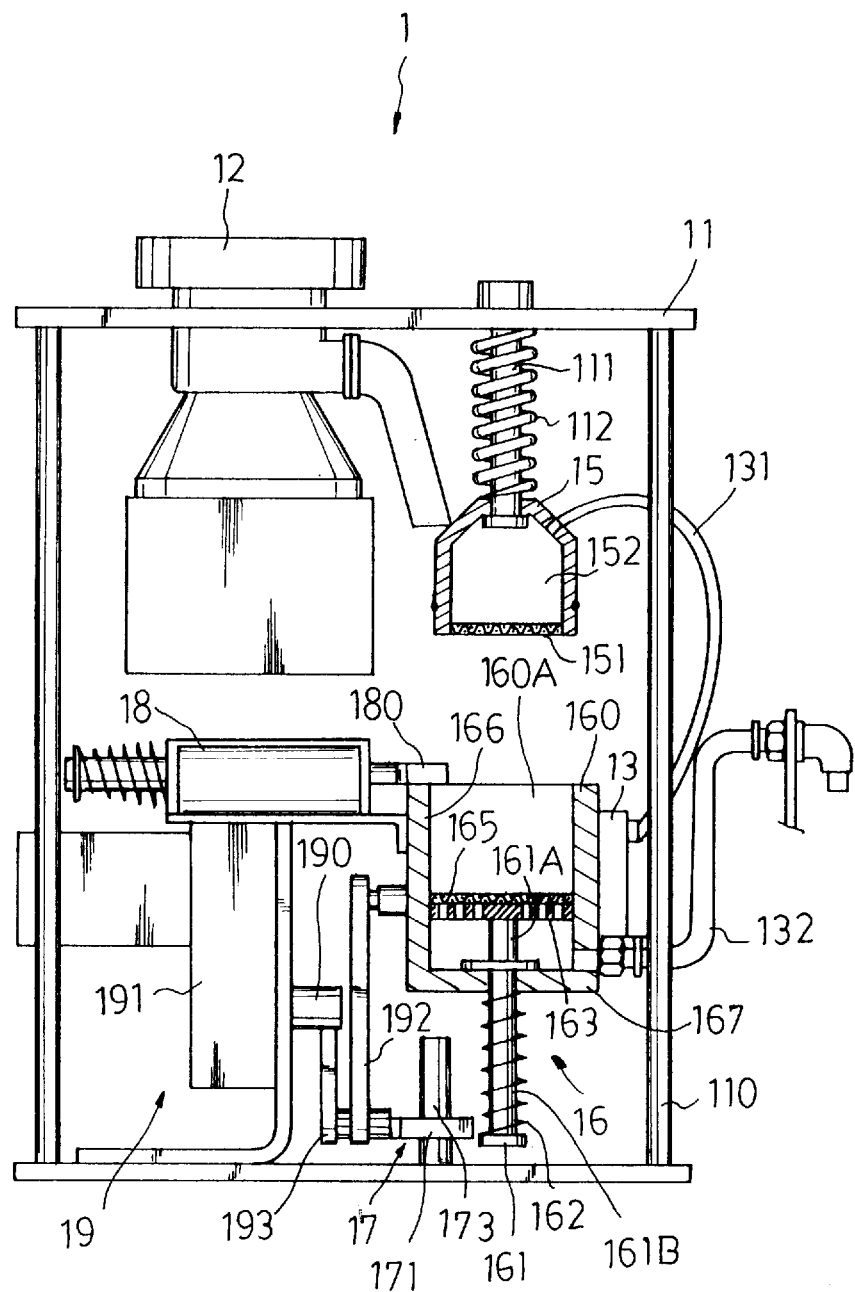
FIG. 1 is a perspective view of a first preferred embodiment of an automatic infusing apparatus of this invention.
Figure 2:
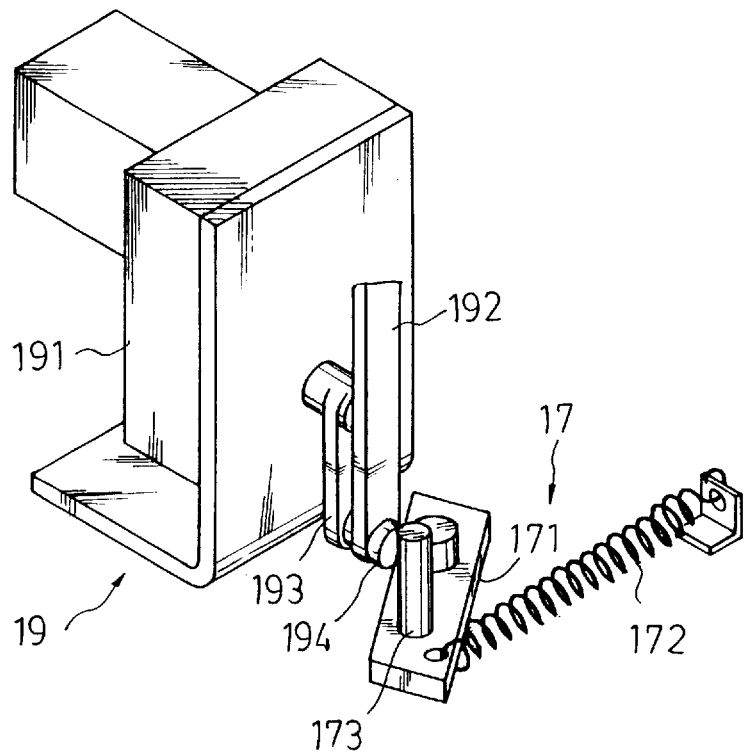
FIG. 2 is an enlarged view illustrating interrelation of a prop member and lifting and lowering device employed in the first preferred embodiment.
Figure 3:
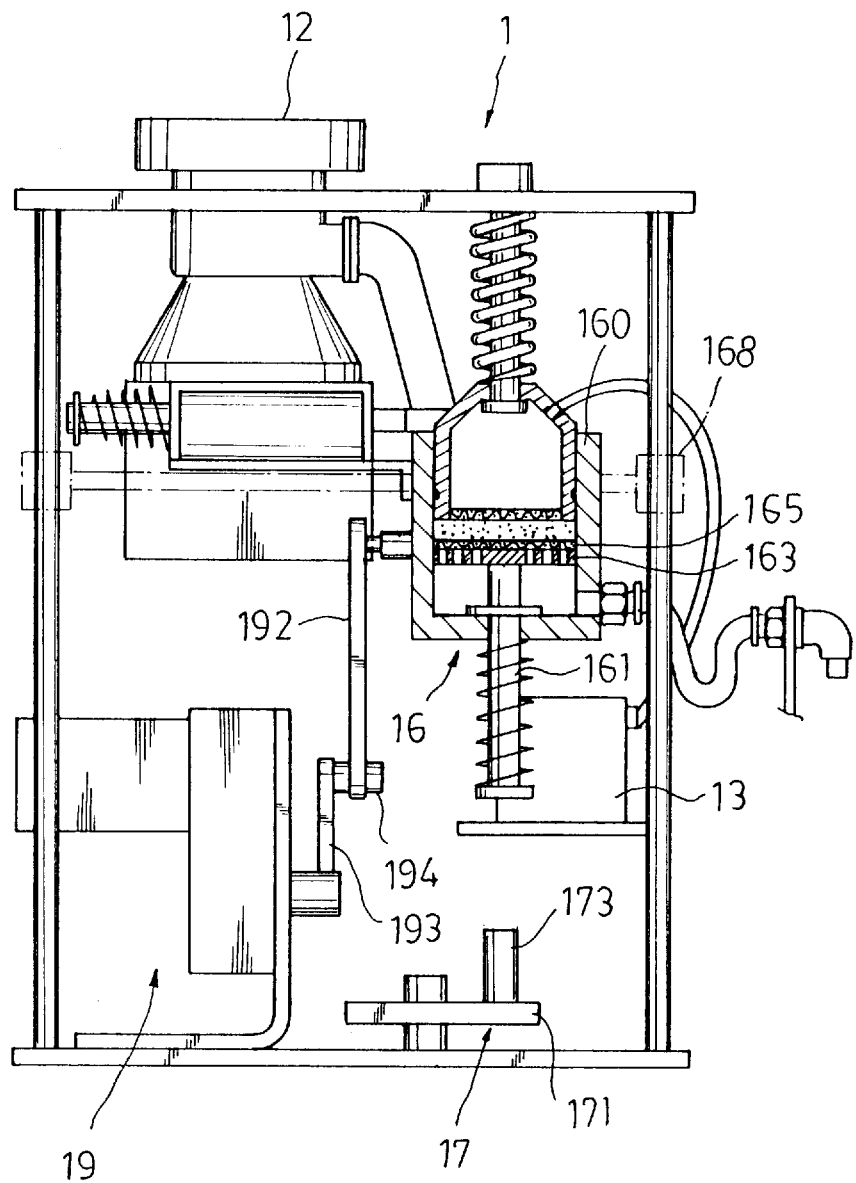
FIG. 3 is a perspective view of the first preferred embodiment, illustrating an infusing container employed therein is lifted to be at a higher position.

Referring to FIGS. 1, 2, and 3, the first preferred embodiment of an automatic infusing apparatus of this invention is shown to includes an infusing container 160 for receipt of infused beverage, means 19 for lifting and lowering the infusing container 160 to a higher position and a lower position, a plunger 16, a first biasing means 162, means 12 for feeding ground beans or grain to the infusing container 160 when the latter is lifted to the higher position, and a scraping device 18 for removal of the infused ground beans.

As illustrated, the infusing container 160 has a lower end wall 167, a peripheral lateral wall 166 which extends uprightly from the lower end wall 167 to define an opened upper end 160A, and an outlet valve 132 disposed near the lower end wall 167 for dispense of the infused beverage.

Figure 4:
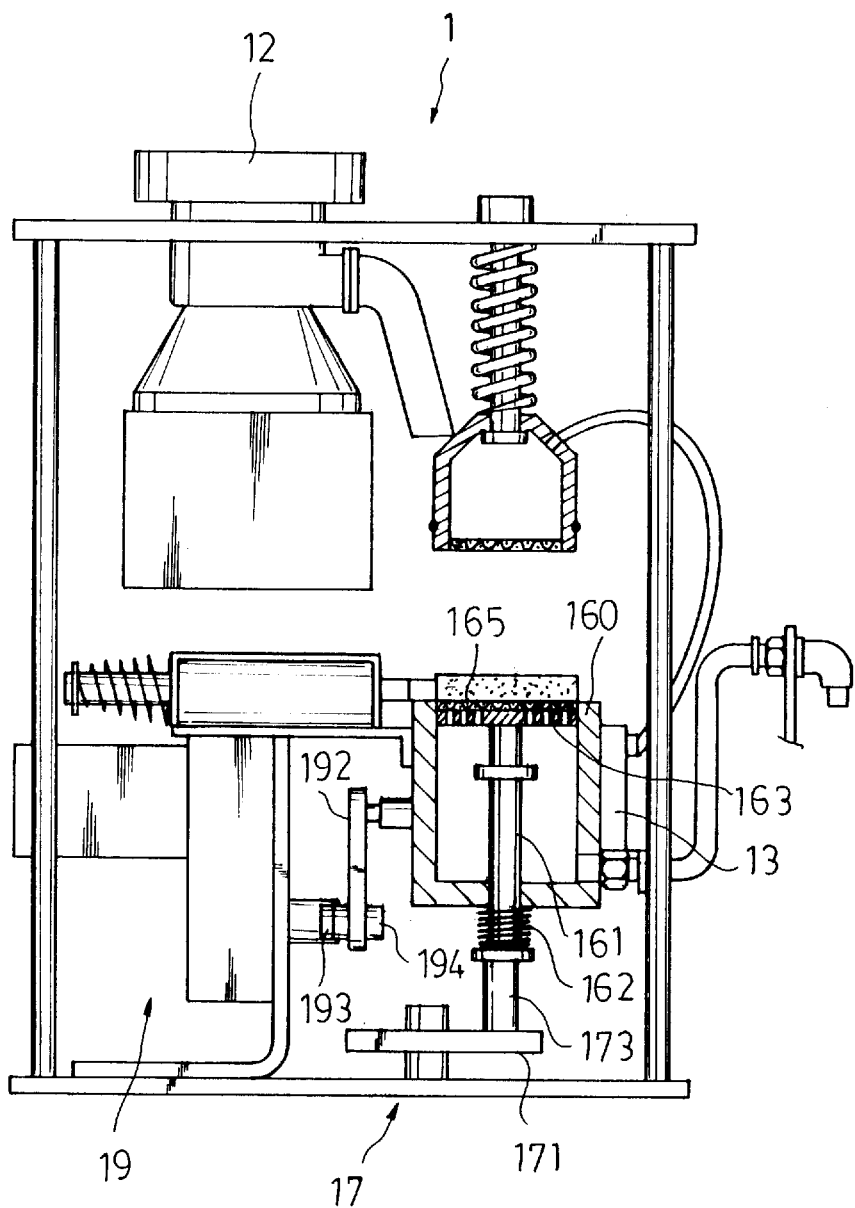
FIG. 4 illustrates how a scrapping device removes the infused beans away from a sifter member of the first preferred embodiment.

The plunger 16 includes a sifter member 165 which is disposed within the infusing container 160 and which has a peripheral portion disposed slidably relative to an inner surface of the peripheral lateral wall 166, and a stem member 161. The stem member 161 has an upper section 161A provided with a perforated plate 163 connected to the sifter member 165, and a lower section 161B extending outwardly and sealingly from the lower end wall 167 of the infusing container 160. The lower section 161B of the stem member 161 is movable relative the lower end wall 167 of the infusing container 160 to lift the sifter member 165 upwardly to a scraped position (see FIG. 4) which is above the brim of the infusing container 160 and downwardly to an infused position (see FIG. 1) such that the ground beans are supported on the sifter member 165 for infusion.

The first biasing means 162, in the form of a coil spring, is sleeved around the lower section 161B of the sifter member 165 to bias the lower end wall 167 to push the sifter member 165 from the scraped position (see FIG. 4) to the infused position, wherein the sifter member 165 is generally at the intermediate portion of the infusing container 160 (see FIG. 1). When the infusing container 160 descends from the higher position to the lower position, the sifter member 165 can be lifted upward from the infused position to the scraped position against the biasing action of the coil spring 162.

The scraping device 18 includes a retractable scraping rod 180, such as solenoid-actuated rod, mounted on the infusing container 160 at a position such that the scraping rod 180 moves transversely relative to an axial direction of the stem member 161 once the sifter member 165 is lifted upward to the scraped position so as to clear the infused ground beans away from the sifter member 165.

The infusing container 160 has a pair of ring members 168 (see FIG. 3) which extend laterally from two opposite sides of the peripheral lateral wall 166 and which are sleeved on the upright posts 110 of a mounting frame 1 so as to guide the infusing container 160 in vertical direction during movement between the higher and lower positions.

The mounting frame 1 includes a squeeze member 15 suspended at the upper portion 11 thereof by the use of a suspension rod 111 so as to overhang the infusing container 160 at a predetermined distance when the infusing container 160 is at the lower position. The squeeze member 15 has a press bottom end 151 to abut against the sifter member 165 when the infusing casing 160 is at the higher position to squeeze the infused beans therebetween. The squeeze member 15 further defines a chamber 152 at an upper portion thereof to receive boiling water from the boiling water reservoir 13 which is mounted on the mounting frame 1 and which is in fluid communication with the chamber 152 by a transmission tube 131. A compression spring 112 is sleeved around the suspension rod 111 to bias the squeeze member 15 to provide cushioning effect when the sifter member 165 is moved upward to abut against the press bottom end 151 of the squeeze member 15.

In the first preferred embodiment, lifting and lowering means 19 includes a driving motor 191 provided with an output shaft 190, a long crank member 192 connected pivotally at a first end to the infusing container 160, a short crank member 193 connected securely to the output shaft 190 at one end thereof and the other end connected pivotally to a second end of the long crank member 192 by means of pin 194 such that rotation of the output shaft 190 will drive the infusing container 160 to move along the lateral upright posts 110 between the higher and lower positions.

Figure 5:
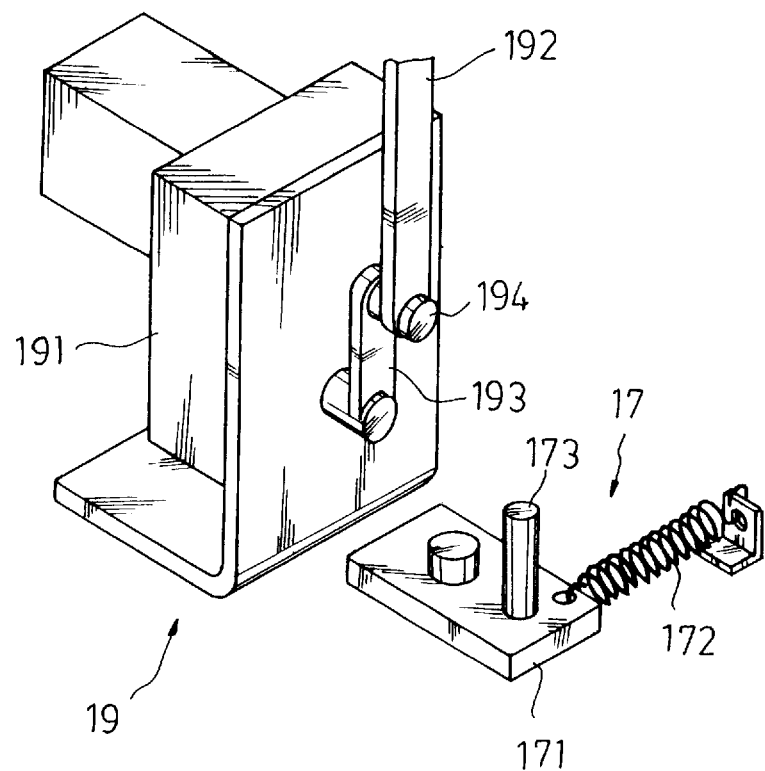
FIG. 5 is another enlarged view illustrating interrelation of the prop member and the lifting and lowering device employed in the first preferred embodiment.

An upright prop member 17 is disposed proximate to the driving motor 191, and includes a slim plate 171 mounted pivotally to the bottom of the mounting frame 1 at one end thereof, a vertical stand 173 fixed on the other end of the plate 171, and a biasing member 172 (a tension spring) which biases the plate 171 so as to abut against the lower crank member 193 such that the vertical stand 173 is offset relative to the stem member 161. Once the short crank 193 starts to ascend and leave from the lower position due to rotation of the output shaft 190, the plate 171 is released from the lower crank member 193, thereby disengaging and correspondingly moving the vertical stand 173 by virtue of the tension spring to a position aligned with the stem member 161. Under such condition, the vertical stand 173 props the stem member 161 against biasing action of the spring 162 to lift the sifter member 165 to the scraped position (see FIGS. 4 and 5) upon descent of the infusing container 160 from the higher position to the lower position.

Figure 7:
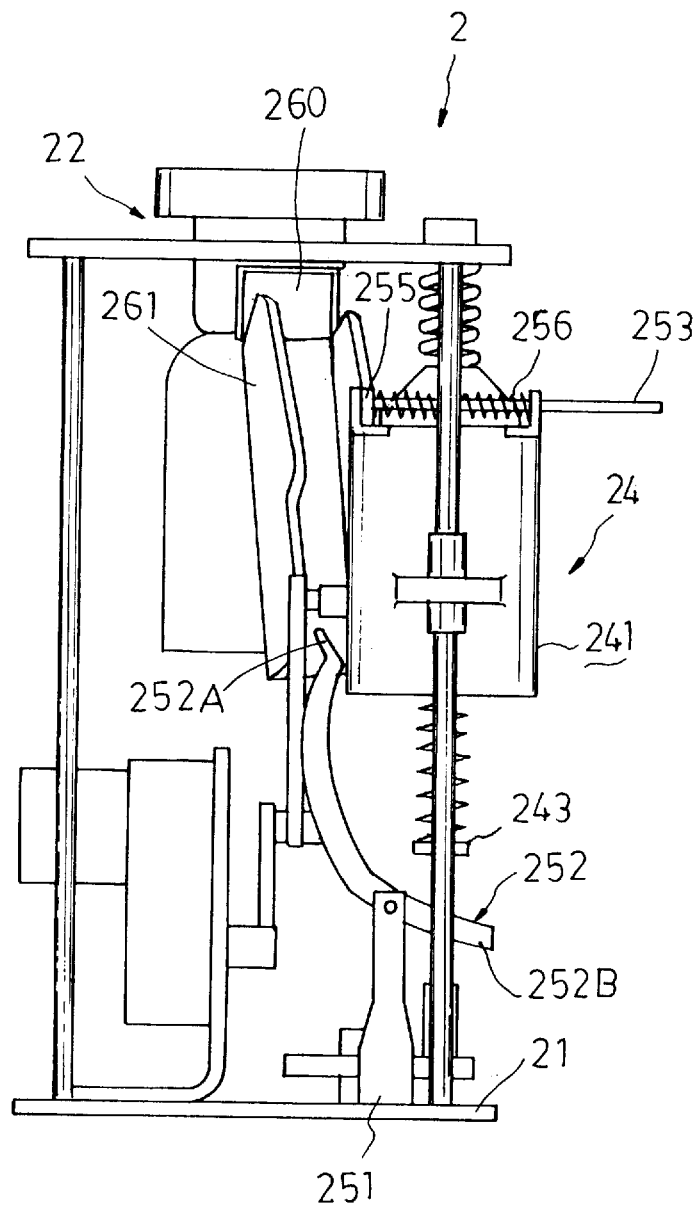
FIG. 7 is a lateral side view of the second preferred embodiment.
Figure 8:
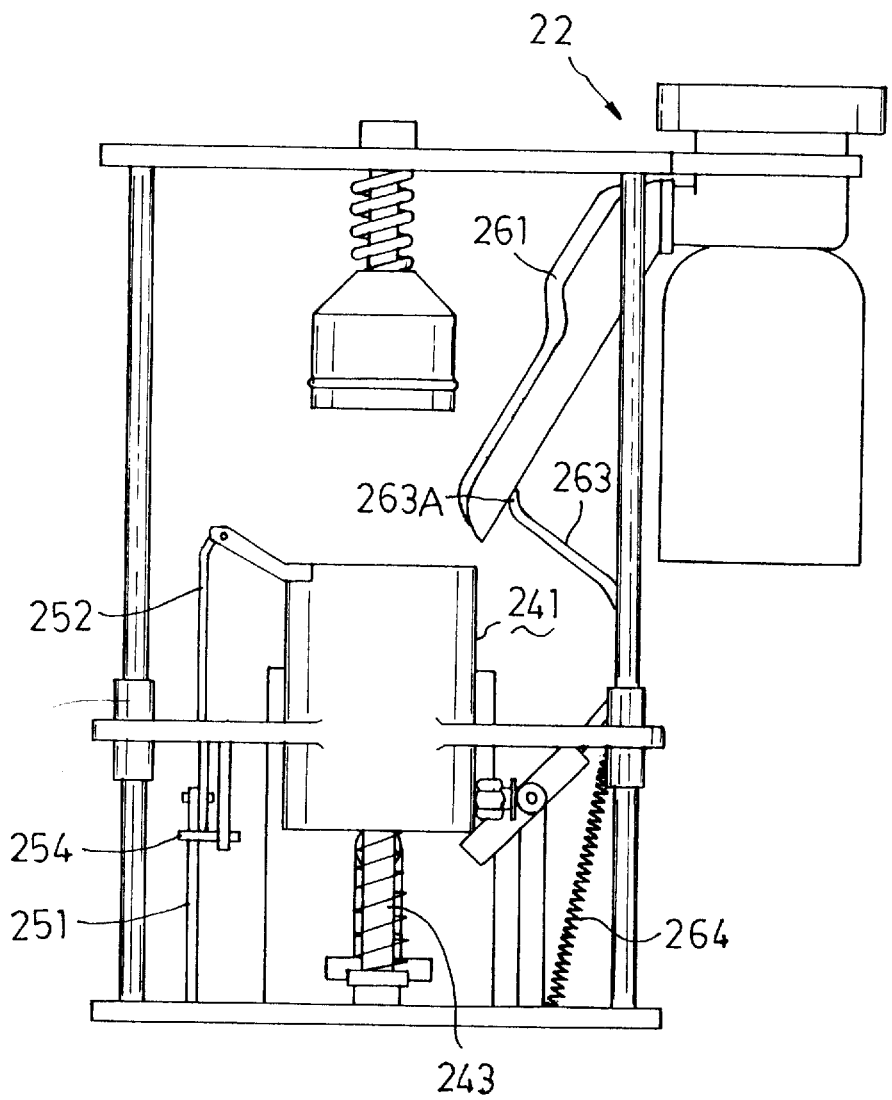
FIG. 8 illustrates how the ground beans are fed into the infusing container of the second preferred embodiment.

Referring to FIGS. 7 and 8, the structure of a second preferred embodiment of this invention is similar to the first preferred embodiment except in the scraping and feeding devices. As illustrated, the scraping device includes a retractable scraping rod 253 provided with a push element 255 and mounted on the infusing container 241 above the brim of the opened upper end, a biasing member 256 to bias the scraping rod 253 to sweep over the brim so as to clear the infused beans or grains away from the sifter member (not visible). The scraping device further includes an upright support 251 fixed on the bottom of the mounting frame 2, a lever 252 pivotally mounted on the upright support 251 and pivotable around a fulcrum axis transverse to the axial direction of the stem member 243, and a driving member 254. The lever 252 includes a driven end 252B and a pushing end 252A at an opposite side of the fulcrum. The driving member 254 is mechanically coupled with one of the sleeve members 250 such that as the sleeve member 250 is moved downwards, the driven end 252B of the lever 252 is driven by the driving member 254 to turn the pushing end 252A around the fulcrum, thereby bringing the pushing end 252A into contact with the peripheral lateral wall of the infusing container 241 until the latter descends to the infused position. At the infused position, the pushing end 252A of the lever 251 will move over the brim so as to push the retractable scraping rod 253 against the biasing member 256 (see FIG. 9).

Figure 6:
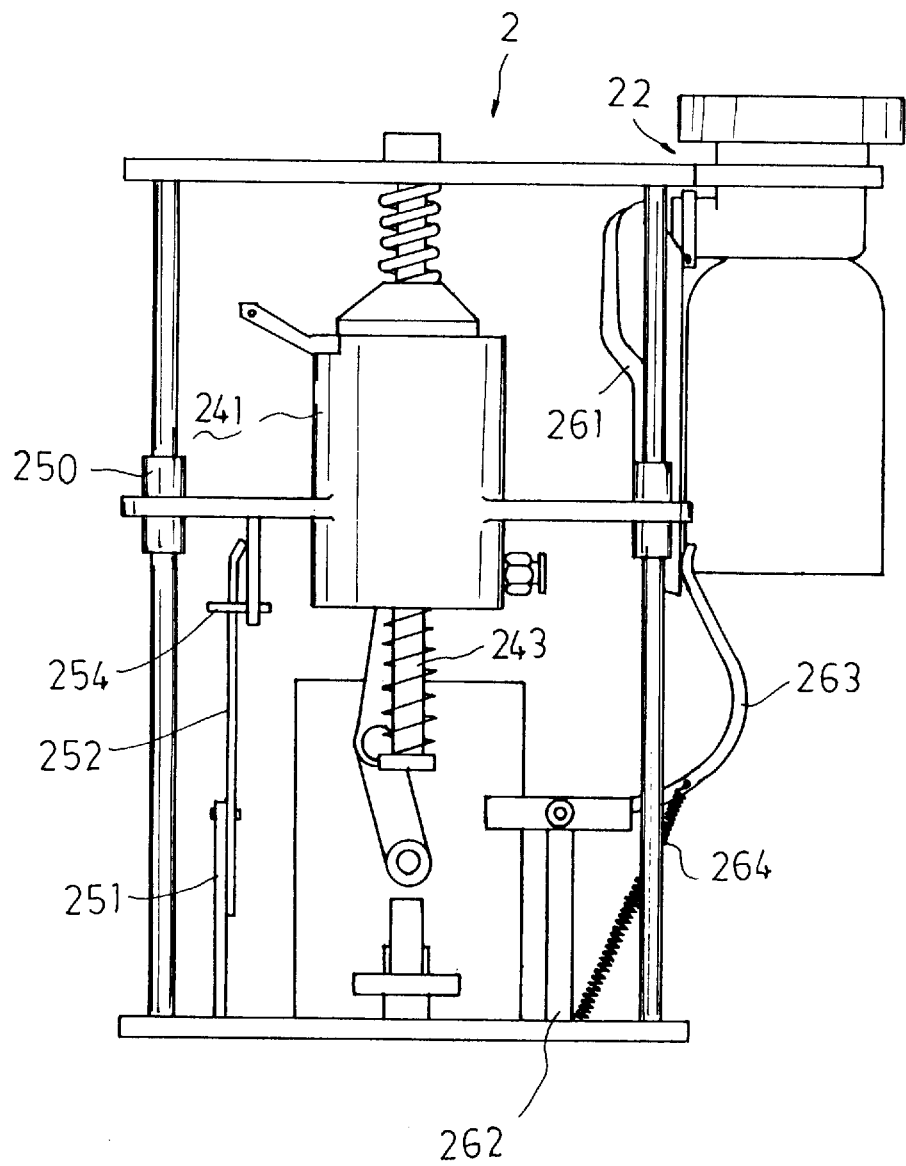
FIG. 6 is a perspective view of a second preferred embodiment of the automatic infusing apparatus of this invention.
Figure 9:
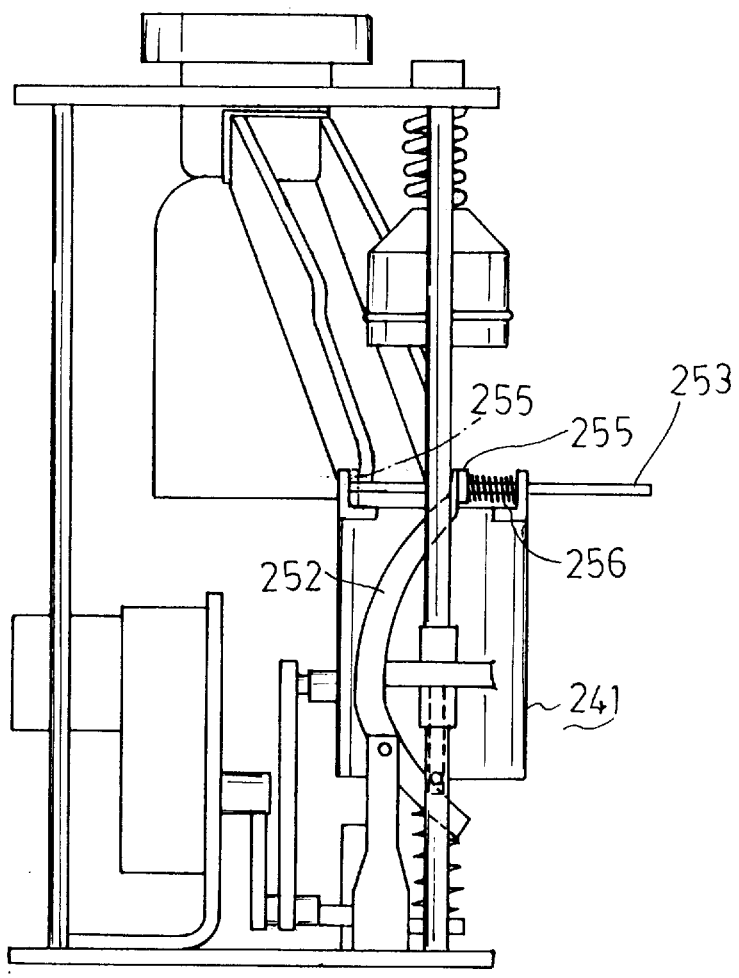
FIG. 9 illustrates how the infused ground beans are removed from the sifter member of the second preferred embodiment.

The feeding device 22 includes a feeding outlet 260 and a guide flange defining a guide groove 261 to guide falling of the ground beans or grains from the outlet 260. The guide flange is mounted to be pivotable between an operating position where the ground beans or grains are guided to fall into the infusing container, as best illustrated in FIGS. 8 and 9, and a folded position where the supply of the ground beans or grains to the infusing container 241 is terminated (see FIGS. 6 and 7). The feeding device 22 further includes an upright support 262 fixed on the bottom of the mounting frame 2, and a curved lever 263 pivotally mounted on the upright support 262. The curved lever 263 is pivotable around a fulcrum axis transverse to the axial direction of the stem member 243. The curved lever 263 has a driven end 263B and a pushing end at an opposite side of the fulcrum. The driven end 163B of the curved lever 263 extends into the moving path of the infusing container 251. Once the infusing container 241 moves downwards, the driven end 263B of the curved lever 263 will be driven by descent of the lower end wall of the infusing container 241 to turn the pushing end 263A around the fulcrum axis to lift the guide groove 261 from the folded position to the operating position.

In the second preferred embodiment, a biasing member 64, such as a tension spring, is used to bias the guide groove 261 from the operating position to the folded position.

As explained, the automatic infusing apparatus of this invention can provide a nice cup of coffee from an instantly ground coffee without causing any inconvenient to the user.

With this invention thus explained, it is apparent that numerous modifications and variations can be made without departing from the scope and spirit of this invention. It is therefore intended that this invention be limited only as indicated in the appended claims.

I claim:

1. An automatic infusing apparatus comprising:
    an infusing container for receiving an infused beverage, said infusing container having a lower end wall, a peripheral lateral wall extending uprightly from said lower end wall to form an opened upper end at an upper edge thereof, and an outlet valve disposed near said lower end wall for dispensing said infused beverage;
    means for lifting and lowering said infusing container to a higher position and a lower position;

a plunger including a sifter member disposed within said infusing container and having a peripheral portion to be slidably moved along an inner surface of said peripheral lateral wall, and a stem member which has an upper section connected to said sifter member and a lower section extending downwardly and outwardly of said lower end wall, said lower section of said stem member being slidable sealingly relative to said lower end wall so as to move said sifter member upwardly to a scraped position which is above brim of said opened upper end, and downwardly to an infused position in which grounded beans or grains can be supported on said sifter member for being infused;

a first biasing member to bias said sifter member to move from said scraped position to said infused position;

means for feeding grounded beans or grains to said infusing container when said infusing container is lifted to said higher position, wherein when said infusing container descends from said higher position to said lower position, said sifter member will be moved upwards from said infused position to said scraped position against biasing action of said first biasing member; and a scraping device including a retractable scraping rod to move transversely relative to an axial direction of said stem member, said scraping device being disposed at a position such that once said sifter member is moved upwards to said scraped position, said scraping rod is pushed in said transverse direction and over said brim of said opened upper end so as to clear said infused beans or grains away from said sifter member.

2. An automatic infusing apparatus as defined in claim 1, further comprising a mounting frame having two lateral upright posts disposed to be parallel to said axial direction of said stem member, and a pair of sleeve members respectively extending from two opposite sides of said peripheral lateral wall in said transverse direction and having a pair of ring members respectively sleeved on said two lateral upright posts to guide said infusing container to move between said higher and lower positions.

3. An automatic infusing apparatus as defined in claim 2, further comprising a squeeze member suspended from said mounting frame and overhung said infusing container with a predetermined distance when said infusing container is at said lower position, said squeeze member having a press bottom end to abut against said sifter member when said infusing container is at said higher position so as to squeeze said infused beans or grains therebetween.

4. An automatic infusing apparatus as defined in claim 3, wherein said squeeze member includes a chamber defined by said press bottom end to receive boiling water for infusion, said press bottom end being water permeable so as to permit dripping of the boiling water from said chamber into said infusing container when said press bottom end abuts against said sifter member.

5. An automatic infusing apparatus as defined in claim 4, further comprising a boiling water reservoir in fluid communication with said chamber so as to supply boiling water to said chamber.

6. An automatic infusing apparatus as defined in claim 3, further comprising a compressing spring disposed to provide a cushioning action to said squeeze member when said sifter member is brought to abut against said press bottom end.

7. An automatic infusing apparatus as defined in claim 1, wherein said lifting and lowering means includes a driving motor provided with an output shaft, a long crank member connected pivotally at a first end to said infusing container, a short crank member connected securely to said output shaft at one end thereof and the other end connected pivotally to a second end of said long crank member such that rotation of said output shaft will drive said infusing container to move along said lateral upright posts between said higher and lower positions.

8. An automatic infusing apparatus as defined in claim 7, wherein said biasing means includes a coil spring sleeved around said lower section of said stem member to bias said sifter member towards said infused position, said biasing means further including an upright prop member disposed at a position offset relative to said stem member, said upright prop member being capable of being moved from said offset position to an aligned position, wherein said upright prop member is aligned with said stem member in an axial direction thereof by said short crank member when said short crank member descends to a lower position corresponding to said infused position of said infusing container such that said prop member is brought to said aligned position to prop said stem member against the biasing action of said coil spring.

9. An automatic infusing apparatus as defined in claim 8, further comprising a second biasing member to bias said upright prop member towards said offset position once said short crank member starts to ascend and depart from said lower position, thereby disengaging said upright prop member.

10. An automatic infusing apparatus as defined in claim 8, wherein said upright prop member is of such a length that when said prop member is aligned with said stem member and said infusing container is lowered to said infused position, said prop member will push against said biasing action of said coil spring to move said stem member as well as said sifter member to said scraped position.

11. An automatic infusing apparatus as defined in claim 1, wherein said retractable scraping rod is solenoid-actuated.

12. An automatic infusing apparatus as defined in claim 1, wherein said retractable scraping rod is mounted on said infusing container and above said brim of said opened upper end, further comprising a third biasing member to bias said scraping rod to sweep over said brim so as to clear said infused beans or grains away from said sifter member, said scraping device further comprising a first upright support and a first lever pivotally mounted on said first upright support and pivotable around a fulcrum axis transverse to said axial direction of said stem member, said first lever including a first driven end and a first pushing end at an opposite side of said fulcrum, a first driving member mechanically coupled with one of said sleeve members such that as said sleeve member is moved downwards, said first driven end is driven by said first driving member so as to turn said first pushing end around said fulcrum axis, thereby bringing said first pushing end into contact with said peripheral lateral wall until said infusing container descends to said infused position, at which said first pushing end will move over said brim so as to push said retractable scraping rod against said third biasing member.

13. An automatic infusing apparatus as defined in claim 1, wherein said feeding means includes a feeding outlet and a guide groove to guide falling of said ground beans or grains from said outlet, said guide groove being disposed to be pivotable between an operating position where said ground beans or grains are guided to fall into said infusing container, and a folded position where the supply of said ground beans or grains to said infusing container is terminated, further comprising a second upright support and a second lever pivotally mounted on said upright support and pivoted around a fulcrum axis transverse to said axial direction of said stem member, said second lever including a second driven end and a second pushing end at an opposite side of said fulcrum, said second driven end being disposed such that as said infusing container is moved downwards, said second driven end will be driven by descending movement of said lower end wall of said infusing container to turn said second pushing end around said fulcrum axis to lift said guide groove from said folded position to said operating position.

14. An automatic infusing apparatus as defined in claim 13, further comprising a fourth biasing member to bias said guide groove from said operating position to said folded position.

* * * * *